US012520343B2

(12) United States Patent
Niu et al.

(10) Patent No.: US 12,520,343 B2
(45) Date of Patent: Jan. 6, 2026

(54) SENSING BEAM DETERMINATION IN UNLICENSED SPECTRUM

(71) Applicant: Apple Inc., Cupertino, CA (US)

(72) Inventors: Huaning Niu, San Jose, CA (US); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 17/973,160

(22) Filed: Oct. 25, 2022

(65) Prior Publication Data
US 2023/0130264 A1    Apr. 27, 2023

Related U.S. Application Data

(60) Provisional application No. 63/272,495, filed on Oct. 27, 2021.

(51) Int. Cl.
H04W 74/08 (2024.01)
H04L 5/00 (2006.01)
(Continued)

(52) U.S. Cl.
CPC ....... H04W 74/0808 (2013.01); H04L 5/0048 (2013.01); H04W 16/14 (2013.01)

(58) Field of Classification Search
CPC ............ H04W 74/0808; H04W 74/08; H04W 74/0833; H04W 74/0836; H04L 5/0048;
(Continued)

(56) References Cited

U.S. PATENT DOCUMENTS

2020/0100276 A1* 3/2020 Oh .................. H04W 16/14
2021/0007149 A1* 1/2021 Li .................... H04L 5/0091
(Continued)

FOREIGN PATENT DOCUMENTS

WO    WO-2021108817 A2 *  6/2021  ........... H04B 7/0617

OTHER PUBLICATIONS

International Search Report for Application No. PCT/US2022/047895, mailed Janury 27, 2023, 4 pages.
(Continued)

Primary Examiner — Phong La
(74) Attorney, Agent, or Firm — Sterne, Kessler, Goldstein & Fox P.L.L.C.

(57) ABSTRACT

Some aspects of this disclosure relate to apparatuses and methods for implementing techniques for a use equipment (UE) to determine, based on a transmission configuration indicator (TCI) state, a sensing beam to wirelessly communicate with a base station over a channel in an unlicensed spectrum. The UE can receive, using a receiving beam, control information including a TCI state, determine a sensing beam indicated by the TCI state included in the control information, sense a channel occupancy of the channel between the UE and the base station by performing Clear Channel Assessment using the sensing beam. Furthermore, the UE can determine, based on the channel occupancy, whether the channel is free to be utilized for communication by the UE using the sensing beam.

19 Claims, 6 Drawing Sheets

(51) Int. Cl.
  *H04W 16/14* (2009.01)
  *H04W 74/0808* (2024.01)
(58) Field of Classification Search
  CPC ... H04L 5/0053; H04L 5/0032; H04L 5/0037; H04L 5/0042; H04L 5/0044; H04L 5/0058; H04L 5/0078
  See application file for complete search history.

(56) References Cited

U.S. PATENT DOCUMENTS

| | | | | |
|---|---|---|---|---|
| 2021/0105749 | A1* | 4/2021 | Zhou | H04L 5/0023 |
| 2021/0185719 | A1* | 6/2021 | Xue | H04L 5/0092 |
| 2021/0306125 | A1* | 9/2021 | Khoshnevisan | H04W 72/0446 |
| 2022/0132543 | A1* | 4/2022 | Bai | H04W 72/044 |
| 2022/0132569 | A1* | 4/2022 | Salah | H04W 74/0833 |
| 2022/0225286 | A1* | 7/2022 | Cirik | H04W 72/046 |
| 2022/0322433 | A1* | 10/2022 | Zhang | H04B 7/088 |
| 2023/0130264 | A1* | 4/2023 | Niu | H04L 5/0032 370/329 |
| 2024/0073949 | A1* | 2/2024 | Bhamri | H04W 74/0816 |
| 2024/0155679 | A1* | 5/2024 | Niu | H04W 74/006 |
| 2024/0235782 | A1* | 7/2024 | Lin | H04L 5/0044 |

OTHER PUBLICATIONS

Apple Inc., "Channel access mechanisms for unlicensed access above 52.6GHz", 3GPP Draft; R1-2110026, $3r^{rd}$ Generation Partnership Project (3GPP), Mobile Competence Centre; 650, Route Des Lucioles; F-06921 Sophia-Antipolis Cedex; France, vol. RAN WG1, No. e-Meeting; Oct. 11, 2021-Oct. 19, 2021, Oct. 2, 2021, XP052058962, 9 pages.

* cited by examiner

SENSING BEAM DETERMINATION IN UNLICENSED SPECTRUM

CROSS REFERENCES

This application claims the benefit of U.S. provisional Application No. 63/272,495 filed Oct. 27, 2021, entitled "SENSING BEAM DETERMINATION IN UNLICENSED SPECTRUM," the content of which is herein incorporated by reference in its entirety.

BACKGROUND

Field

The described aspects generally relate to wireless communication in unlicensed spectrum.

Related Art

Unlicensed spectrum plays an important role in the current wireless communication technology. For example, the fifth generation (5G) new radio (NR) in unlicensed spectrum (NR-U) provides the technology for cellular operators to fully integrate the unlicensed spectrum into 5G networks. NR-U enables both uplink and downlink operations in unlicensed bands, supporting new features such as wideband carriers. In unlicensed spectrum, channel access in both downlink and uplink may rely on a listen-before-talk (LBT) feature. A wireless device or a base station may first "sense" the communication channel in the unlicensed spectrum to be "free" prior to any transmission.

SUMMARY

Some aspects of this disclosure relate to apparatuses and methods for implementing techniques for determining a sensing beam of a user equipment (UE) having a multiple-input multiple-output (MIMO) antenna array to communicate with a base station in unlicensed spectrum. In some current wireless communication systems, such as the fifth generation (5G) new radio (NR) system, massive MIMO has become a default technology. For a MIMO system, signals transmissions are beam-formed using directional beams. The selection of a transmission beam can impact the communication performance between the UE and the base station. A UE may first "sense" using a sensing beam the communication channel in the unlicensed spectrum to be "free" prior to any transmission. Data may be transmitted after the channel is determined to be free based on the sensing of the channel performed by the UE or the base station using the sensing beam.

Some aspects of this disclosure relate to a UE. The UE can include one or more antenna panels, and a processor communicatively coupled to the one or more antenna panels. An antenna panel may include a plurality of antenna elements. The one or more antenna panels can be configured to wirelessly communicate with a base station over a channel in an unlicensed spectrum, e.g., a frequency band higher than 52.6 Ghz. A sensing beam may be formed based on the plurality of antenna elements, where the sensing beam can include a directional sensing beam, an omni beam sensing beam, a quasi-omni sensing beam, a pseudo-omni beam sensing, or multiple sensing beams. The sensing beam can be used to sense a channel occupancy of the channel in the unlicensed spectrum by performing a clear channel assessment (CCA) using the sensing beam.

According to some aspects, the processor of the UE can be configured to receive, from the base station, using a receiving beam, control information including a transmission configuration indicator (TCI) state, where the TCI state can indicate the sensing beam. In some embodiments, the control information can further include an uplink (UL) spatial relation among uplink channels, where the sensing beam can be determined based on the UL spatial relation. In some embodiments, the control information can further include a cell-specific signaling to configure an effective isotropic radiated power (EIRP) used for performing the CCA to sense the channel occupancy of the channel. In some embodiments, the control information can further include an instruction to disable a configured grant (CG) channel occupancy time (COT) period from being shared by multiple UEs in communication with the base station.

According to some aspects, when a unified TCI framework is enabled between the UE and the base station, the TCI state can include a joint indication to indicate a downlink (DL) TCI state and an UL TCI state. In some embodiments, when a unified TCI framework is enabled, the TCI state can include a DL TCI state and an UL TCI state separated from the DL TCI state. In some embodiments, the TCI state can specify a reference signal to be used which is Quasi Co Location (QCL) type D to the sensing beam, to sense the channel occupancy, where the reference signal can include a synchronization signal blocks (SSB), a sounding reference signal (SRS), or a channel state information reference signal (CSI-RS). In some embodiments, the TCI state can be selected from a list of TCI states configured by the base station, and the TCI state can be included in a medium access control (MAC) control element (CE), and carried in a DL scheduling downlink control information (DCI) format.

According to some aspects, the processor of the UE can be configured to determine a sensing beam indicated by the TCI state included in the control information, and sense a channel occupancy of the channel between the UE and the base station by performing a CCA using the sensing beam. Based on the channel occupancy, the processor of the UE can be configured to determine whether the channel is free to be utilized for communication by the UE using the sensing beam. In response to a determination that the channel is free to be utilized, the processor of the UE can be configured to transmit a response to the base station to indicate the sensing beam can be used for communication between the UE and the base station. Afterwards, the processor of the UE can be configured to transmit data from the UE to the base station using the sensing beam.

According to some aspects, to transmit the response to the base station, the processor of the UE can be configured to transmit an acknowledgement to the base station using a transmission beam related to the receiving beam, where the transmission beam is different from the sensing beam. In some embodiments, the processor of the UE can be configured to transmit a sounding reference signal (SRS) to the base station using the sensing beam. In some embodiments, in response to a determination that the channel is not free to be utilized by the UE using the sensing beam, the processor of the UE can be configured to send a negative response to the base station using a transmission beam related to the receiving beam, where the transmission beam is different from the sensing beam.

Some aspects of this disclosure relate to a base station. A base station can include a transceiver configured to wirelessly communicate with a UE over a channel in an unlicensed spectrum, and a processor communicatively coupled to the transceiver. The processor can be configured to generate control information and transmit the control information to the UE. The control information can include a TCI state to indicate a sensing beam based on a plurality of antenna elements of the UE to be used for communication by the UE with the base station. In some embodiments, the TCI state can be included in a medium access control (MAC) control element (CE), and carried in a downlink (DL) scheduling downlink control information (DCI) format.

In some embodiments, the processor can be configured to configure a list of TCI states by Radio Resource Control (RRC) layer, and select the TCI state from the list of TCI states to be included in the control information. In some embodiments, the processor can be configured to receive, from the UE, a response to indicate the sensing beam is configured to be used for communication between the UE and the base station.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
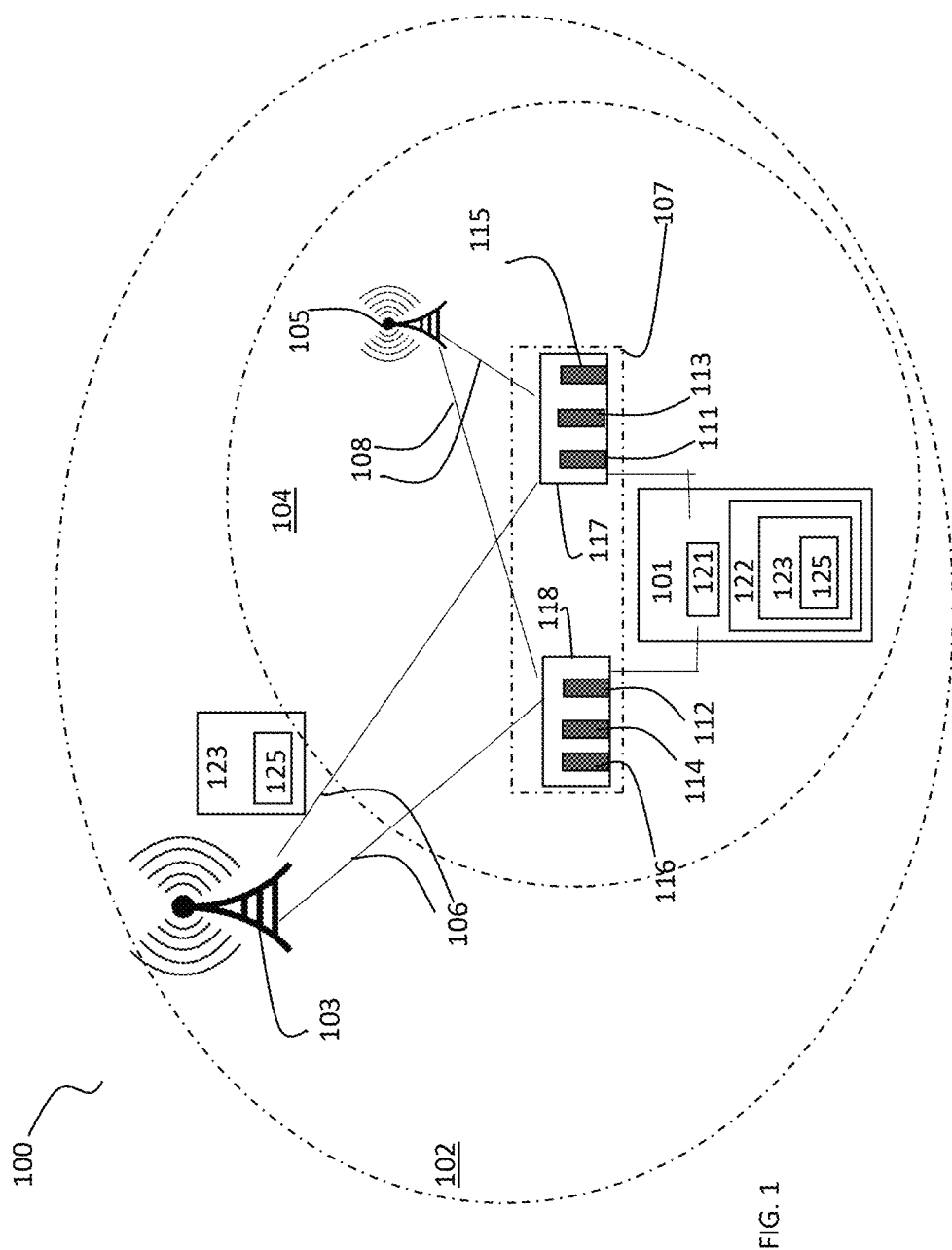
FIG. 1 illustrates a wireless system including a user equipment (UE) having a sensing beam determined based on a transmission configuration indicator (TCI) state to wirelessly communicate with a base station over a channel in an unlicensed spectrum, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Unlicensed spectrum plays an important role in the current wireless communication technology, such as New Radio (NR) in unlicensed spectrum (NR-U). In detail, NR-U can have a variety of options for flexibly utilizing unlicensed spectrum, such as license-assisted access (LAA), or stand-alone mode. The unlicensed spectrum can include the 2.4 GHz, 5 GHz, or millimeter-wave (mmWave) carrier frequencies (30-300 GHz) bands, e.g., above 52.6 GHz. For communication in mmWave bands, where a user equipment (UE) may have multiple-input multiple-output (MIMO) antenna array, directional communications using directional antenna elements are desirable due to propagation conditions. In some examples, a smart antenna system can be used, where all antenna elements are considered as pseudo-omni or quasi-sector-omni antenna elements including a phase shifter. A directional receiving or transmission antenna beam (herein "beam") can be formed by adjusting the phase shifter of the antenna element. Directional beamforming can be used to overcome propagation limits like severe pathloss, blocking, and oxygen absorption.

In unlicensed spectrum, a Listen-Before-Talk (LBT) mechanism can be performed by the UE using a sensing beam to sense the channel occupancy by a clear channel assessment (CCA) check before utilizing the channel. A sensing beam of a UE may refer to a beam of the UE used for sensing the channel occupancy. CCA uses energy detection (ED) to detect the presence (i.e., channel is busy) or absence (i.e., channel is free) of other signals on the channel. If the detected energy during an initial CCA period is lower than a certain threshold, the channel is deemed to be free, and the device can utilize the channel for a period called channel occupancy time (COT). On the other hand, when the detected energy during an initial CCA period is higher than the threshold, the channel is deemed to be busy, and the device cannot utilize the channel.

Some aspects of this disclosure provide mechanisms to determine a sensing beam of a UE having a MIMO antenna array to communicate with a base station in unlicensed spectrum in a wireless system, such as a further enhanced MIMO (FeMIMO) system. At an initial time instance, a UE may use a receiving beam and a transmission beam related to the receiving beam to communicate with the base station. Afterwards, for various reasons, such as efficiency or channel quality, the base station may determine for the UE to switch to a sensing beam to transmit data to the base station, where the sensing beam can be different from the transmission beam related to the receiving beam at the initial time instance.

A sensing beam can be determined based on a transmission configuration indicator (TCI) state contained in control information transmitted from the base station to the UE. The UE may receive the TCI state and the control information by the receiving beam. In some embodiments, the TCI state can be transmitted in a downlink control information (DCI) format 1-1 to indicate the sensing beam for dynamically grant (DG) and configured grant (CG) Physical uplink shared channel (PUSCH) transmission. Additionally and alternatively, the sensing beam can be determined based on an uplink (UL) spatial relation among uplink channels contained in the control information. The UE may first sense, using the sensing beam, the channel in the unlicensed spectrum to be free prior to any transmission. If the channel is free to be utilized, the UE may transmit an acknowledgement to the base station in the DCI format 1-1, or trigger a sounding reference signal (SRS) transmission to the base station. Afterwards, data may be transmitted from the UE to the base station by PUSCH using the sensing beam. If the channel is not free to be utilized, the UE may continue the transmission to the base station using the transmission beam related to the receiving beam at the initial time instance, which is different from the sensing beam.

FIGS. 1A-1B illustrate a wireless system 100 including a UE 101 having a sensing beam determined based on a TCI state to wirelessly communicate with a base station 103 over a channel in unlicensed spectrum, according to some aspects of the disclosure. Wireless system 100 is provided for the purpose of illustration only and does not limit the disclosed aspects. Wireless system 100 can include, but is not limited to, UE 101, base station 103, and a base station 105. UE 101 communicates with base station 103 over channel 106 in unlicensed spectrum, and communicates with base station 105 over channel 108, which can be unlicensed spectrum or licensed spectrum. In some embodiments, wireless system 100 can be a standalone system including only base station 103 and UE 101, without base station 105. In some examples, wireless system 100 can be a NR-U system, a LTE system, a 5G system, or some other wireless system. There can be other network entities, e.g., network controller, a relay station, not shown.

According to some aspects, channel 106 can be in various unlicensed spectrum, e.g., sub 7 GHz, or mmWave bands, e.g., 37 Ghz band, 60 GHz bands, or any frequency band higher than 52.6 Ghz. Accordingly, wireless system 100 can be any wireless system, e.g., an indoor sub 7 GHz system, an indoor mmWave system, an outdoor sub 7 GHz system, or an outdoor mmWave system.

According to some aspects, channel 108 can be in an unlicensed spectrum or a licensed spectrum. Accordingly, wireless system 100 can be a wireless system having carrier aggregation (CA) between licensed band NR and unlicensed band NR-U. Similarly, wireless system 100 can be a wireless system having dual connectivity between licensed band LTE and unlicensed band NR-U, standalone unlicensed band NR-U, NR with downlink in unlicensed band and uplink in licensed band, dual connectivity between licensed band NR and unlicensed band NR-U. In addition, wireless system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103 and base station 105 can be a fixed station or a mobile station. Base station 103 and base station 105 can also be called other names, such as a base transceiver system (BTS), an access point (AP), a transmission/reception point (TRP), an evolved NodeB (eNB), a next generation node B (gNB), a 5G node B (NB), or some other equivalent terminology.

According to some aspects, base station 103 can provide wireless coverage for a cell 102, while base station 105 can provide wireless coverage for a cell 104 contained within cell 102. In some other embodiments, cell 102 can overlap partially with cell 104. Cell 102 or cell 104 can be a macro cell, a pico cell, a femto cell, and/or another type of cell. For comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 can be a macro cell, while cell 104 can be a pico cell or a femto cell. In addition, cell 102 can be a pico cell and cell 104 can be a femto cell. In some examples, the geographic area of a cell can move according to the location of a mobile base station. In some examples, base station 103 and base station 105 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, UE 101 can include an antenna 107 having a plurality of antenna panels, e.g., an antenna panel 117, and an antenna panel 118. In general, antenna 107 can include one or more antenna panels. An antenna panel can include an array of antenna elements that can be located in close physical location. For example, antenna panel 118 can include antenna element 112, antenna element 114, and antenna element 116, while antenna panel 117 can include antenna element 111, antenna element 113, and antenna element 115. Any antenna element, e.g., antenna element 111, antenna element 113, and antenna element 115, antenna element 112, antenna element 114, and antenna element 116, can be an omnidirectional antenna element, a quasi-omnidirectional antenna element, a directional antenna element, or any other antenna element. In some examples, antenna 107 can be a smart antenna system, where all antenna elements are considered as pseudo-omni or quasi-sector-omni antenna elements including a phase shifter. A directional receiving beam can be formed by adjusting the phase shifter of the antenna element. Antenna panel 117 and antenna panel 118 are only shown as examples. In some examples, there can be 3 antenna panels, and an antenna panel of the 3 antenna panels includes 2, 4, 8, or 16 antenna elements. Antenna element 111, antenna element 113, antenna element 115, antenna element 112, antenna element 114, and antenna element 116 can include a dipole antenna element, a monopole antenna element, a patch antenna element, a loop antenna element, a microstrip antenna element, or any other type of antenna elements suitable for transmission of RF signals.

According to some aspects, UE 101 can include a processor 121 communicatively coupled to the one or more antenna panels. Processor 121 can receive, from base station 103, using a receiving beam, control information 123 including a TCI state 125, and further save control information 123 and TCI state 125 in memory 122. In some embodiments, TCI state 125 can indicate a sensing beam. Control information 123 may include other information, such as shown in FIG. 2.

According to some aspects, when a unified TCI framework is enabled between UE 101 and base station 103, TCI state 125 can include a joint indication to indicate a DL TCI state and an UL TCI state. In some embodiments, when a unified TCI framework is enabled, TCI state 125 can include a DL TCI state and an UL TCI state separated from the DL TCI state. In some embodiments, TCI state 125 can be transmitted in the DCI format 1-1, where a field can be used to indicate TCI state 125, which is separated from other content of the DCI format 1-1. For example, TCI state 125 can be included in a medium access control (MAC) control element (CE), and carried in a DL scheduling DCI format.

In some embodiments, a TCI state list can be configured by Radio Resource Control (RRC) layer at base station 103. A separate MAC CE can be introduced, which includes a subset of TCI States selected from the RRC configured TCI state list. In some other embodiments, TCI state 125 can be indicated by a legacy TCI state field in the DCI format 1-1. One TCI code point in the DCI format 1-1 can be mapped to UL TCI state or joint TCI state, which can be configured by a MAC CE.

In some embodiments, TCI state 125 can specify a reference signal that is Quasi Co Location (QCL) type D with the sensing beam to sense the channel occupancy, where the reference signal can include a synchronization signal blocks (SSB), a sounding reference signal (SRS), or a channel state information reference signal (CSI-RS). In some embodiments, an additional field can be added to the DCI format 1-1 to represent the reference signals used by the sensing beam. For example, an independent field sensing-reference-signal can be added to the DCI format 1-1, which can indicate an SSB/CSI-RS/SRS. With the added independent field, a content for the sensing-reference-signal can be optionally provided. If no content is provided for the added independent field, the reference signal used to provide spatial relation information can be used as sensing reference signal. In some other embodiments, the content to indicate the choice of SSB/CSI-RS/SRS can be transmitted from a different serving cell or bandwidth part (BWP), and the serving cell index and BWP index can be included. In some embodiments, base station 103 can configure a list of sensing reference signals. The association between a sensing reference signal and TCI state 125 can be configured by the RRC or the MAC CE at base station 103.

According to some aspects, processor 121 can be configured to determine a sensing beam indicated by TCI state 125, and sense a channel occupancy of channel 106 between UE 101 and base station 103 by performing CCA using the sensing beam. A sensing beam may be formed based on the plurality of antenna elements, where the sensing beam can include a directional sensing beam, an omni beam sensing beam, a quasi-omni sensing beam, a pseudo-omni beam sensing, or multiple sensing beams. The sensing beam can be used to sense a channel occupancy of the channel in the unlicensed spectrum by performing CCA using the sensing beam. In some embodiments, different sensing techniques can be applied, such as sensing omni-directionally as used in omni LBT, or sensing in a directional manner with the sensing beam towards the intended receiver as used in directional LBT. In some embodiments, directional sensing can be performed in paired directions, e.g., in the transmitting direction and its opposite direction(s).

In some embodiments, when the unified TCI framework is not enabled, each UL channel can potentially have a different TCI state. UE 101 may determine the proper sensing beam for all UL channels within a COT. Control information 123 may include a UL spatial relationship in the MAC CE that may carry the TCI state. Additionally and alternatively, a sensing-reference-signal can be configured in, or associated with, the UL spatial relation. If a UL spatial relation is configured for an uplink channel, UE 101 can use the sensing-reference-signal to derive the sensing beam. In some embodiments, for a PUSCH transmission scheduled by DCI format 0_1 or DCI format 02, or configured-grant PUSCH, UE 101 can use the same sensing beam as the SRS indicated by the SRS resource indicator (SRI). For a PUSCH transmission scheduled by DCI format 00, UE 101 may use the same sensing beam as used for the PUCCH transmission with a lowest identification, which may be used to determine the spatial relation for the PUSCH transmission.

Based on the channel occupancy, processor 121 can be configured to determine whether channel 106 is free to be utilized for communication by the UE using the sensing beam. In response to a determination that channel 106 is free to be utilized, processor 121 can be configured to transmit a response to the base station to indicate the sensing beam is configured to be used for communication between the UE and the base station. Afterwards, processor 121 can be configured to transmit data from UE 101 to base station 103 using the sensing beam.

According to some aspects, to transmit the response to the base station, processor 121 can be configured to transmit an acknowledgement to base station 103 using a transmission beam related to the receiving beam, where the transmission beam is different from the sensing beam. In some embodiments, processor 121 can be configured to transmit a sounding reference signal (SRS) to base station 103 using the sensing beam. In some embodiments, in response to a determination that channel 106 is not free to be utilized by UE 101 using the sensing beam, processor 121 can be configured to send a negative response to base station 103 using a transmission beam related to the receiving beam, where the transmission beam is different from the sensing beam.

In some embodiments, a sensing beam can be determined based on the TCI state 125. However, transmission on the sensing beam can fail for various reasons. When channel 106 is at the unlicensed spectrum higher than 52.6 GHz, persistent blocking issue can cause the sensing beam to fail. For example, using a receiving beam, UE 101 can receive TCI state 125, which indicates a sensing beam that may have a higher L1-RSRP than the transmission beam associated with the receiving beam. However, UE 101 may perform directional sensing using the sensing beam indicated by TCI state 125, and determines channel 106 is not free, when base station 105 is transmitting to another UE in the coverage area. In this case, UE 101 may decide to continue to use the transmission beam related to the receiving beam before the TCI state 125 is received.

In some embodiments, when the DCI 1-1 format is used to indicate TCI state 125 to UE 101, an acknowledgement can be sent. To enable receiver assisted TCI state switching, UE 101 can perform directional CCA using the sensing beam indicated by TCI state 125. If UE 101 determines channel 106 is free based on the CCA measurement, UE 101 can send an acknowledgement to base station 103. Afterwards, base station 103 and UE 101 can move to the sensing beam to communicate over channel 106. If UE 101 determines channel 106 is not free based on the CCA measurement, UE 101 can send a negative acknowledgement (NACK) if UL transmission is still within the COT. When UE 101 determines channel 106 is not free based on the CCA measurement, and UL transmission is outside of COT, no NACK is transmitted by UE 101. In case a negative acknowledgement (NACK) is sent, or discontinuous transmission (DTX) is detected, UE 101 and base station 103 can continue to use the receiving beam and the related transmission beam instead of using the sensing beam indicated by TCI state 125.

In some embodiments, when the DCI 1-1 format is used to indicate TCI state 125 to UE 101, TCI state 125 can trigger SRS transmission associated with the TCI state 125. To enable receiver assisted TCI state switching, UE 101 can perform directional CCA using the sensing beam determined based on TCI state 125. The SRS may be transmitted based on the determined sensing beam. If UE 101 determines channel 106 is free based on the CCA measurement, UE 101 can transmit a SRS to base station 103. Afterwards, base station 103 and UE 101 can move to communicate using the sensing beam after TCI state switching delay, e.g. after X symbols after the last symbol of SRS transmission, where X can be predefined or reported by UE capability or configured by RRC or DCI. If UE 101 determines channel 106 is not free based on the CCA measurement, regardless whether UL transmission is inside or outside of a COT, no SRS is transmitted by UE 101. In case of no SRS transmission by UE 101, UE 101 and base station 103 can continue to use the receiving beam and the related transmission beam instead of using the sensing beam indicated by TCI state 125.

Figure 2A:
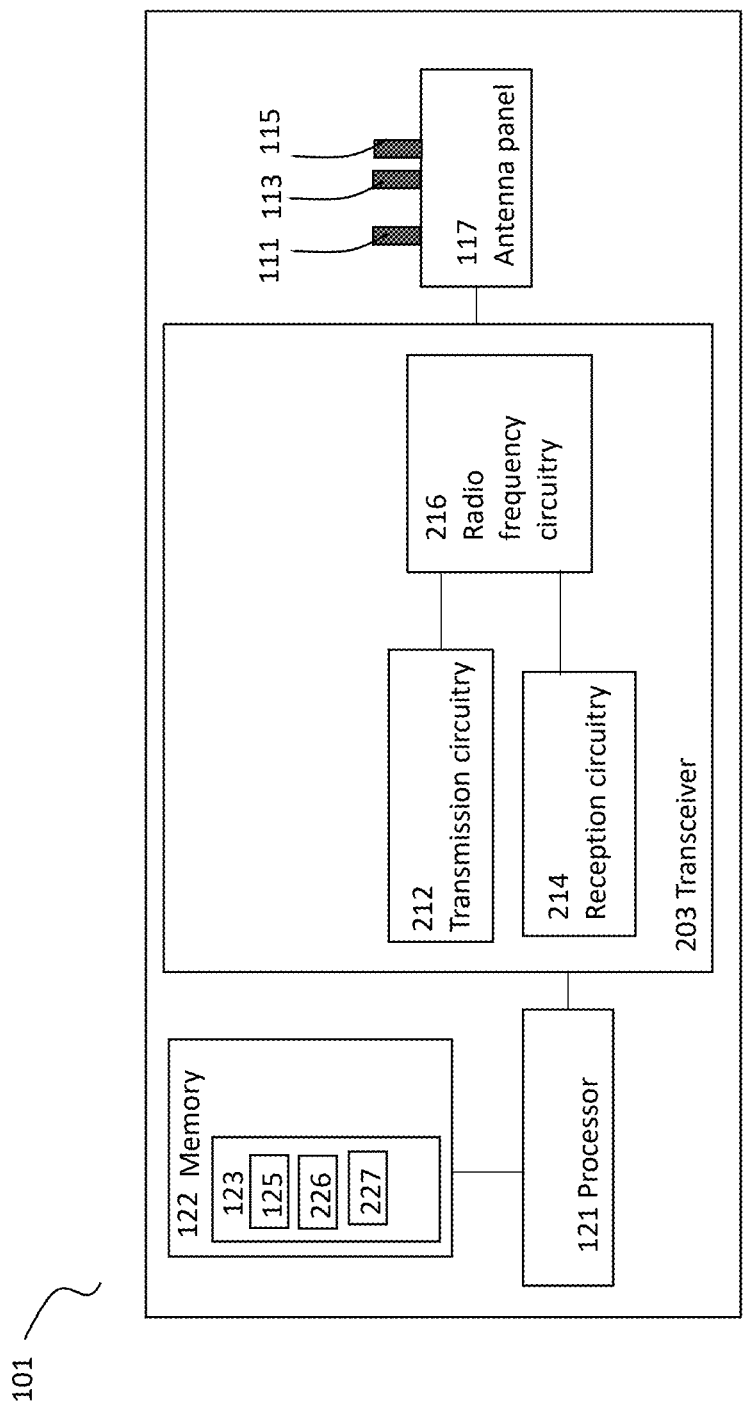
FIGS. 2A-2B illustrate block diagrams of a UE and a base station having at least an antenna panel including multiple antenna elements, according to some aspects of the disclosure.

FIG. 2A illustrates a block diagram of UE 101, having antenna panel 117 including antenna element 111, antenna element 113, antenna element 115. Antenna element 111, antenna element 113, antenna element 115 share a same transceiver 203 and controlled by processor 121. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 121 can be coupled to memory 122, where control information 123 and TCI state 125 can be stored. Furthermore, antenna element 111, antenna element 113, antenna element 115 of antenna panel 117 can share common power procedures (e.g., that may be collectively powered on or powered off), can be used to form a shared beam (e.g., by controlling a gain, phase shift of individual antenna element). In some MIMO embodiments, one or more of the antennas elements can be effectively separated to take advantage of spatial diversity and the different channel characteristics. FIG. 2A only shows the circuitry for one antenna panel, e.g., antenna panel 117. Additional circuitry for other antenna panels, e.g., antenna panel 118 can have additional circuitry similar to that shown in FIG. 2A. In some embodiments, circuitry for antenna panel 117 and circuitry for antenna panel 118 can share some components.

Figure 3:
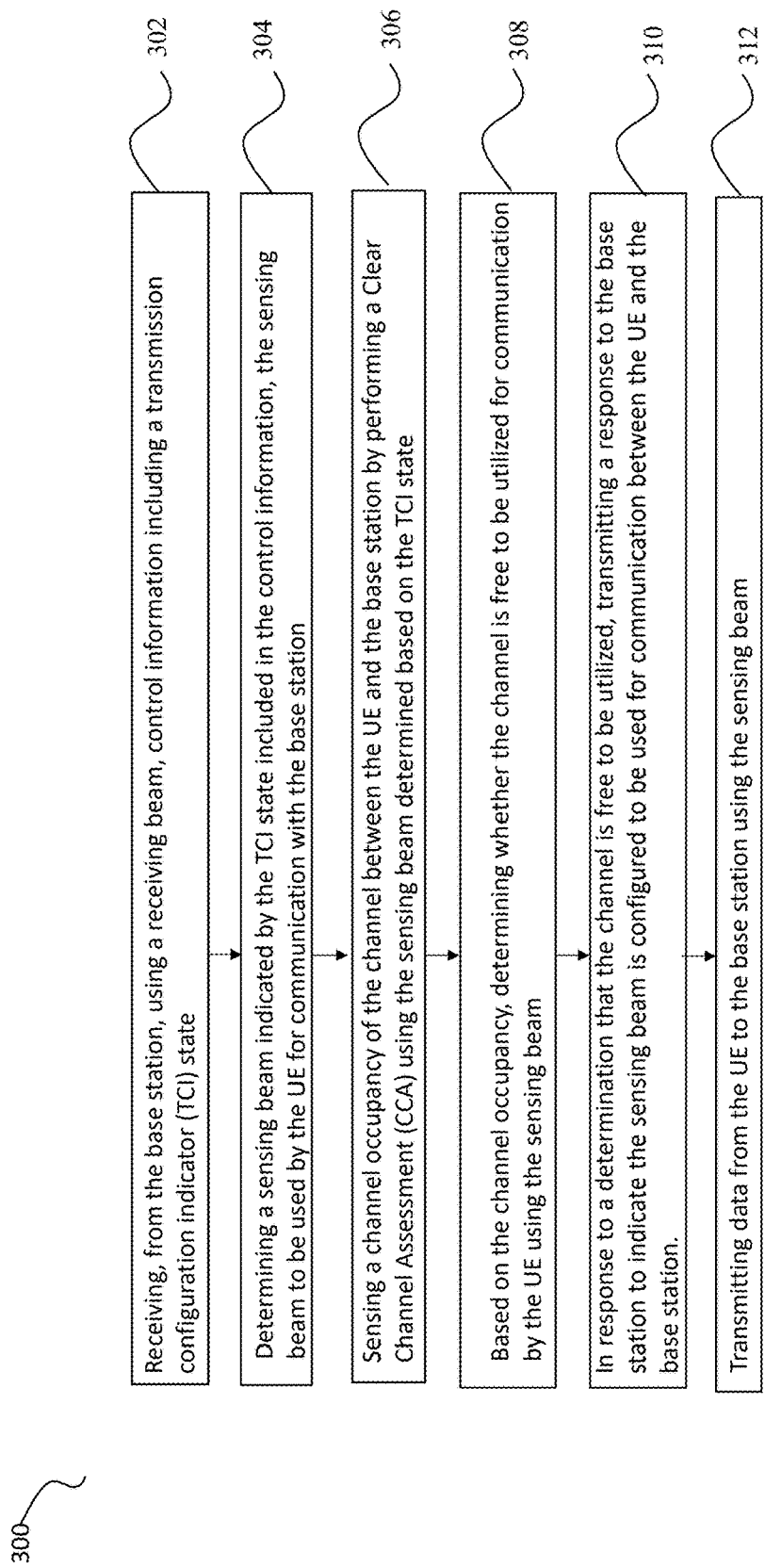
FIGS. 3-4 illustrate example methods performed by a UE or a base station for determining a sensing beam based on a TCI state, according to some aspects of the disclosure.
Figure 4:
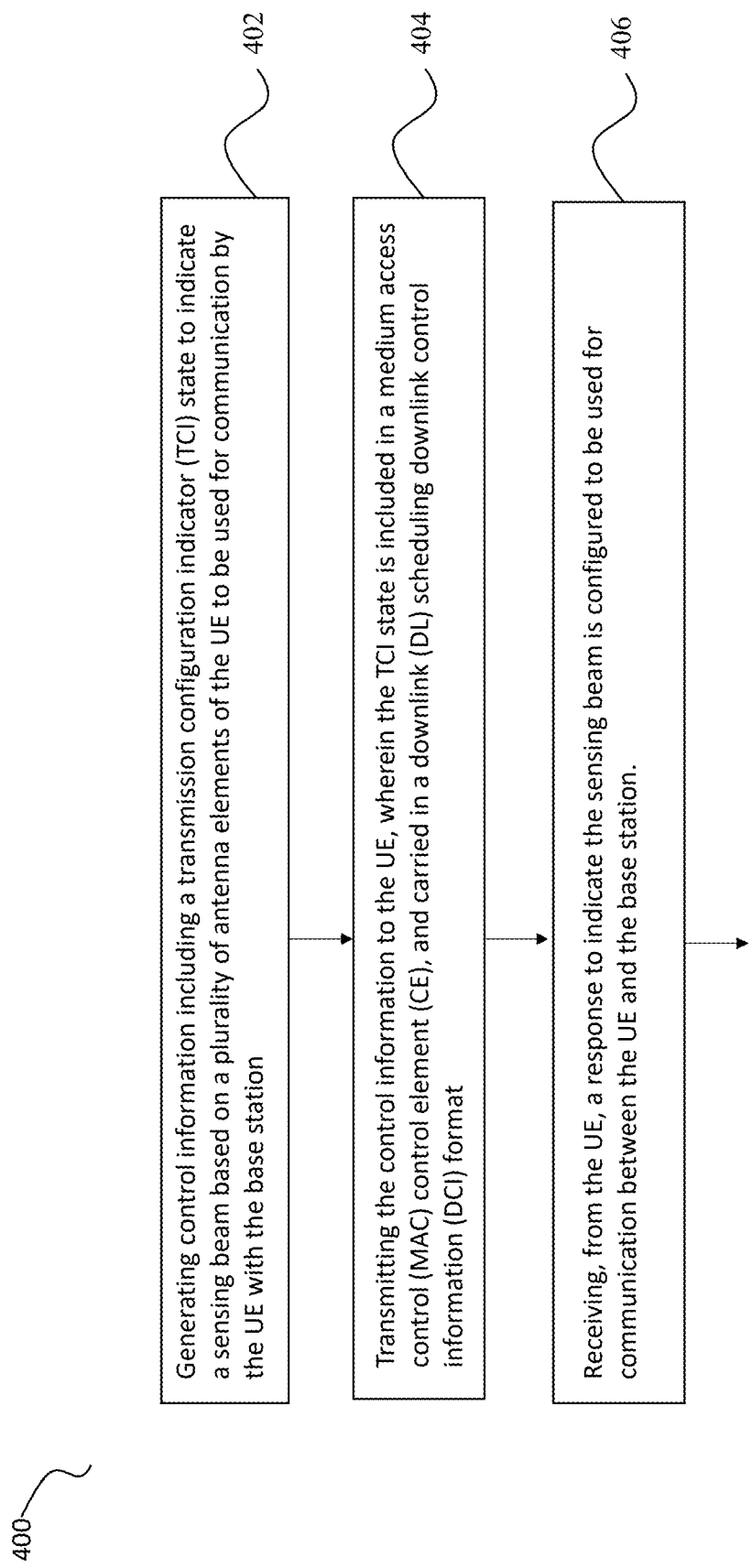

Memory 122 can include instructions, that when executed by processor 121 perform the functions described herein for FIGS. 1 and 3-4. Alternatively, processor 121 can be "hard-coded" to perform the functions described herein. More detailed operations to be performed by UE 101 or processor 121 are illustrated in FIG. 3, while operations performed by base station 103 are illustrated in FIG. 4.

In some embodiments, control information 123 can further include a cell-specific signaling 226 to configure an effective isotropic radiated power (EIRP) used by the UE for performing the CCA to sense the channel occupancy of the channel. In some embodiments, control information 123 can further include an instruction 227 to disable a configured grant (CG) channel occupancy time (COT) period from being shared by the UEs in communication with the base station.

In some embodiments, UE 101 can initiate base station 103 sharing a channel occupancy in a UE-initiated COT. Base station 103 can be allowed to transmit control/broadcast signals/channels for any UEs as long as the transmission contains data or control information for UE 101 that initiated the COT. Any unicast transmission from base station 103 that includes user plane data may only be transmitted to UE 101.

In some embodiments, in FR2-2, COT sharing may be modified based on sensing beam. When directional sensing is used, base station 103 may only be allowed to transmit any unicast transmission from base station 103 that includes control and user plane data intended to be sent to UE 101. When omni/quai-omni sensing is used, base station 103 may be allowed to transmit control/broadcast signals/channels for any UEs as long as the transmission contains transmission for UE 101 that has initiated the COT. Any unicast transmission from base station 103 that includes user plane data is only transmitted to UE 101 that initiated the channel occupancy.

In some embodiments, UE 101 may perform CCA using the sensing beam determined based on TCI state 125 to sense channel 106, where the CCA is based on EIRP measurement. UE 101 can receive UE specific signaling 226 to configure that direction sensing is enabled, and the COT sharing may depend on the EIRP measurement in the sensing. The EIRP value used in CCA can be equal, or lower, or larger the UE max EIRP report. When larger, UE 101 can share the COT with base station 103 having a larger EIRP value.

In some embodiments, instead of having a UE-specific signaling, a cell-specific signaling can configure a directional sensing and EIRP for all UEs within the cell. The configured EIRP can be higher than UE max EIRP, and can be based on max EIRP for base station 103. Base station 103 can set omni sensing or directional sensing to all the UEs within the cell.

In some embodiments, there may not be any signaling configured for an EIRP used for performing the CCA. Base station 103 can use default value as UE 101 reported specific max EIRP. Base station shared COT may be limited to the same TCI state and same EIRP, with the limitation of transmission.

In some embodiments, control information 123 may include instruction 227 to disable a configured grant (CG) channel occupancy time (COT) period from being shared by multiple UEs in communication with the base station. Accordingly, instruction 227 may indicate no UE initiated COT sharing. In CG configuration, base station 103 may add one choice to disable CG COT sharing. When CG COT sharing is disabled, no sensing TCI or EIRP will be reported in CG UCI.

Figure 2B:
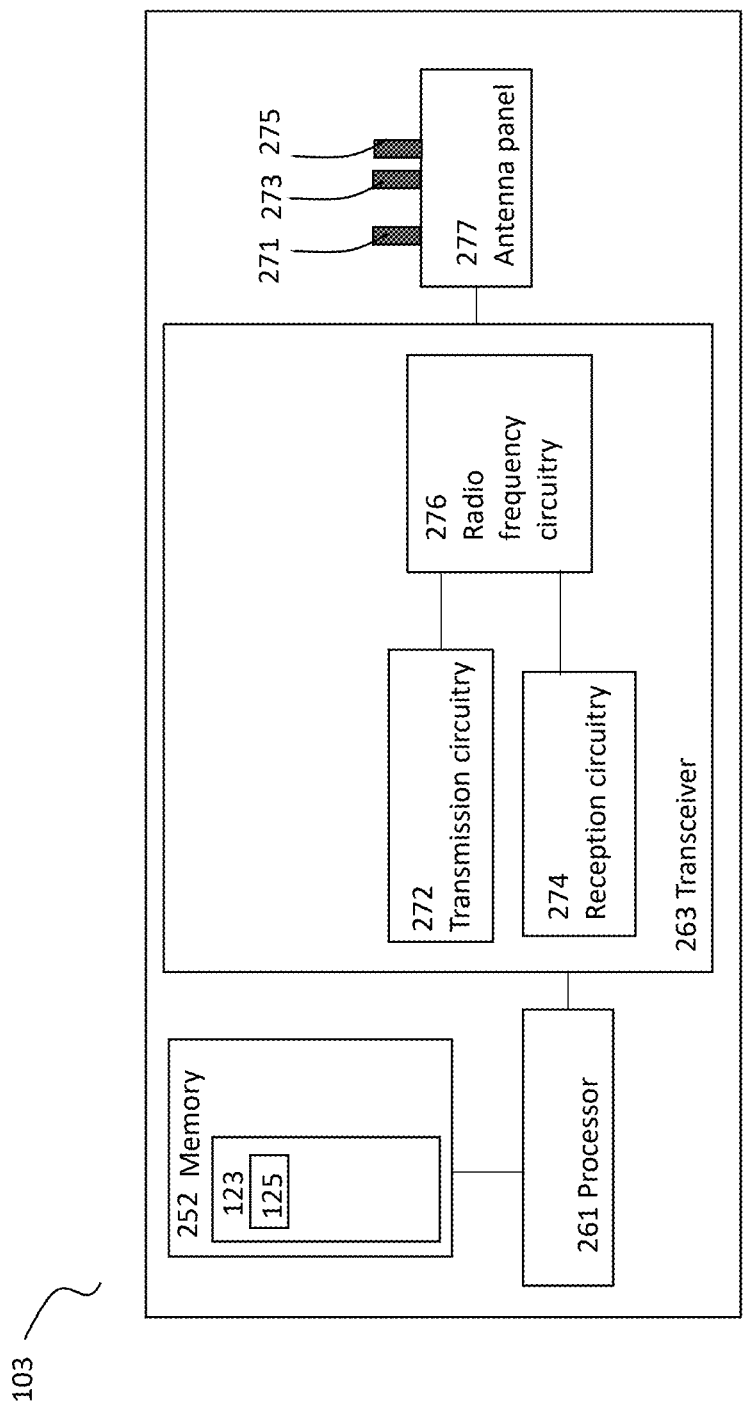

FIG. 2B illustrates a block diagram of base station 103, having antenna panel 277 including antenna element 271, antenna element 273, antenna element 275. Antenna element 271, antenna element 273, antenna element 275 share a same transceiver 263 and controlled by processor 261. In detail, transceiver 263 can include RF circuitry 276, transmission circuitry 272, and reception circuitry 274. RF circuitry 276 can include multiple parallel RF chains for one or more of transmit or receive functions, each connected to one or more antenna elements of the antenna panel. In addition, processor 261 can be coupled to memory 252, where control information 123 and TCI state 125 can be stored. Furthermore, antenna element 271, antenna element 273, antenna element 275 can share common power procedures (e.g., that may be collectively powered on or powered off), can be used to form a shared beam (e.g., by controlling a gain, phase shift of individual antenna element). In some MIMO embodiments, one or more of the antennas elements can be effectively separated to take advantage of spatial diversity and the different channel characteristics.

Memory 252 can include instructions, that when executed by processor 261 perform the functions described herein for FIGS. 1 and 3-4. Alternatively, processor 261 can be "hard-coded" to perform the functions described herein. More detailed operations to be performed by base station 103 or processor 261 are illustrated in FIG. 4.

FIGS. 3-4 illustrate respective example methods performed by a UE and a base station for determining a sensing beam based on a TCI state, according to some aspects of the disclosure. According to some aspects, as shown in FIG. 3, method 300 can be performed by UE 101 to determine a sensing beam based on a TCI state.

At 302, UE 101 can receive, from the base station, using a receiving beam, control information including a TCI state. For example, UE 101 can receive from base station 101, using a receiving beam, control information 123 containing TCI state 125.

At 304, UE 101 can determine a sensing beam indicated by the TCI state included in the control information, the sensing beam to be used by the UE for communication with the base station. For example, UE 101 can determine a sensing beam indicated by TCI state 125 included in control information 123, the sensing beam to be used by UE 101 for communication with base station 103. Before receiving TCI state 125, UE 101 may communicate with base station 103 using a receiving beam and a transmission beam related to the receiving beam. After receiving TCI state 125, UE 101 may determine the sensing beam to be different from the transmission beam related to the receiving beam, and may perform a switch from the transmission beam related to the receiving beam to the sensing beam.

At 306, UE 101 can sense a channel occupancy of the channel between the UE and the base station by performing a CCA using the sensing beam determined based on the TCI state. For example, UE 101 can sense a channel occupancy of channel 106 by performing a CCA using the sensing beam determined based on TCI state 125.

At 308, based on the channel occupancy, UE 101 can determine whether the channel is free to be utilized for communication by the UE using the sensing beam. For example, based on the channel occupancy obtained by performing the CCA using the sensing beam, UE 101 can determine that channel 106 is free to be utilized for communication by UE 101 using the sensing beam.

At 310, in response to a determination that the channel is free to be utilized, UE 101 can transmit a response to the base station to indicate the sensing beam can be used for communication between the UE and the base station.

At 312, UE 101 can transmit data from UE 101 to base station 103 using the sensing beam.

According to some aspects, FIG. 4 illustrates the operations of method 400 performed by a base station, e.g., base station 103, to determine a sensing beam based on a TCI state.

At 402, base station 103 can generate control information including a TCI state to indicate a sensing beam based on a plurality of antenna elements of the UE to be used for communication by the UE with the base station. For example, base station 103 can generate control information 123 including TCI state 125 to indicate a sensing beam based on a plurality of antenna elements of UE 101 to be used for communication by UE 101 with base station 103. Information about UE 101 and its antenna configurations may be communicated to base station 103 during the initial communication setup phase, such as beam sweeping. A TCI state 125 may be selected based on the measurement reports from UE 101 for the improvement of quality of channel 106.

At 404, base station 103 can transmit the control information to the UE, wherein the TCI state is included in a MAC CE, and carried in a DL scheduling DCI format. For example, base station 103 can transmit control information 123 to UE 101, wherein TCI state 125 is included in a MAC CE, and carried in a DL scheduling DCI format, such as DCI format 1-1.

At 406, base station 103 can receive, from UE 101, a response to indicate the sensing beam can be used for communication between UE 101 and base station 103.

Figure 5:
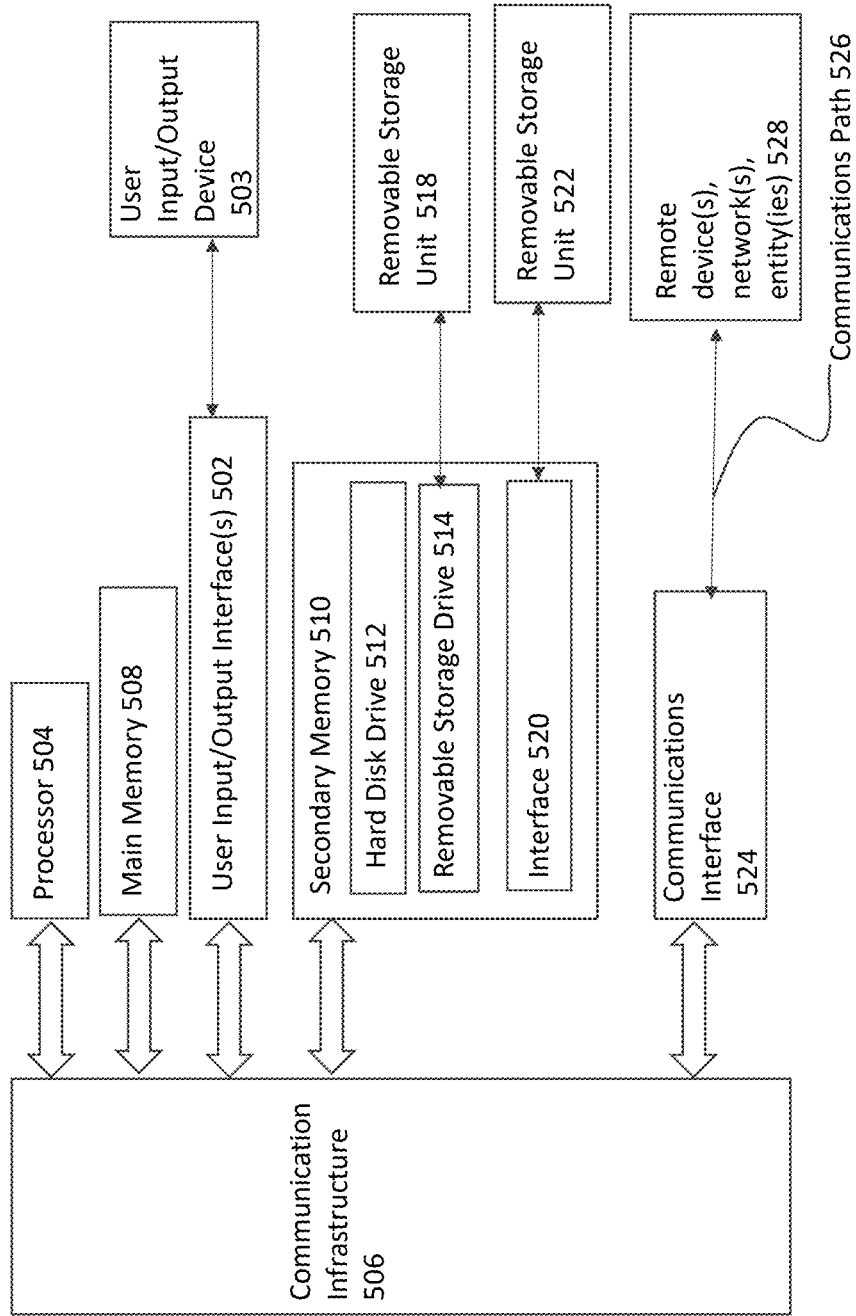
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the operations described herein such as UE 101, base station 103, or base station 105 as shown in FIGS. 1-2, and operations described in FIGS. 3-4. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or abase station, e.g., UE 101, base station 103, or base station 105 as shown in FIGS. 1-2, and operations described in FIGS. 3-4.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
an antenna panel including a plurality of antenna elements configured to wirelessly communicate with a base station over a channel in an unlicensed spectrum; and
a processor communicatively coupled to the plurality of antenna panels and configured to:
receive, from the base station using a receiving beam, control information including a transmission configuration indicator (TCI) state;
determine a sensing beam indicated by the TCI state included in the control information, the sensing beam to be used by the UE for communication with the base station;
sense a channel occupancy of the channel between the UE and the base station by performing a Clear Channel Assessment (CCA) using the sensing beam determined based on the TCI state, wherein the control information further includes a cell-specific signaling to configure an effective isotropic radiated power (EIRP) used for performing the CCA to sense the channel occupancy of the channel; and based on the channel occupancy, determine whether the channel is free to be utilized by the UE for communication with the base station using the sensing beam.

2. The UE of claim 1, wherein the processor is further configured to:

in response to a determination that the channel is free to be utilized, transmit a response to the base station to indicate the sensing beam can be used for communication between the UE and the base station.

3. The UE of claim 2, wherein to transmit the response to the base station, the processor is configured to:

transmit an acknowledgement to the base station using a transmission beam related to the receiving beam, wherein the transmission beam is different from the sensing beam; or transmit a sounding reference signal (SRS) to the base station using the sensing beam.

4. The UE of claim 1, wherein the processor is further configured to:

in response to a determination that the channel is free to be utilized, transmit data from the UE to the base station using the sensing beam.

5. The UE of claim 1, wherein the processor is further configured to:

in response to a determination that the channel is not free to be utilized by the UE using the sensing beam, send a negative response to the base station using a transmission beam related to the receiving beam, wherein the transmission beam is different from the sensing beam.

6. The UE of claim 1, wherein the sensing beam includes a directional sensing beam, an omni beam sensing beam, a quasi-omni sensing beam, a pseudo-omni beam sensing, or multiple sensing beams.

7. The UE of claim 1, wherein a unified TCI framework is enabled between the UE and the base station, and wherein the TCI state includes a joint indication to indicate a downlink (DL) TCI state and an uplink (UL) TCI state, wherein the sensing beam is determined based on the joint TCI state and the UL TCI state.

8. The UE of claim 1, wherein a unified TCI framework is enabled between the UE and the base station, and wherein the TCI state includes a downlink (DL) TCI state and an uplink (UL) TCI state separated from the DL TCI state.

9. The UE of claim 1, wherein the TCI state specifies a reference signal Quasi Co Location (QCL) typed D to the sensing beam to sense the channel occupancy, and wherein the reference signal includes a synchronization signal blocks (SSB), a sounding reference signal (SRS), or a channel state information reference signal (CSI-RS).

10. The UE of claim 1, wherein the TCI state is selected from a list of TCI states configured by the base station, and the TCI state is included in a medium access control (MAC) control element (CE), and carried in a downlink (DL) scheduling downlink control information (DCI) format.

11. The UE of claim 1, wherein the control information further includes an uplink (UL) spatial relation among uplink channels, and wherein the sensing beam is determined based on the UL spatial relation.

12. The UE of claim 1, wherein the control information further includes an instruction to disable a configured grant (CG) channel occupancy time (COT) period from being shared by the UE in communication with the base station.

13. A base station, comprising:

a transceiver configured to enable wireless communication with a user equipment (UE) over a channel in an unlicensed spectrum; and a processor communicatively coupled to the transceiver and configured to:

generate control information including a transmission configuration indicator (TCI) state to indicate a sensing beam based on a plurality of antenna elements of the UE to be used for communication by the UE with the base station; and transmit the control information to the UE, wherein the TCI state is included in a medium access control (MAC) control element (CE), and carried in a downlink (DL) scheduling downlink control information (DCI) format, and wherein the control information further includes a cell-specific signaling to configure an effective isotropic radiated power (EIRP) used for performing a Clear Channel Assessment (CCA) using the sensing beam determined based on the TCI state.

14. The base station of claim 13, wherein the processor is further configured:

configure a list of TCI states by Radio Resource Control (RRC) layer; and select the TCI state from the list of TCI states to be included in the control information.

15. The base station of claim 13, wherein the processor is further configured:

receive, from the UE, a response to indicate the sensing beam can be used for communication between the UE and the base station.

16. The base station of claim 15, wherein to receive the response to indicate the sensing beam, the processor is configured to receive a sounding reference signal (SRS) from the UE that is transmitted by the sensing beam.

17. The base station of claim 13, wherein the TCI state is to indicate a directional sensing beam to be used by the UE, and the processor is further configured to transmit to the UE a unicast transmission that includes control and user plan data, wherein the UE initiates a channel occupancy.

18. The base station of claim 13, wherein the TCI state is to indicate an omni sensing beam or a quai-omni sensing beam to be used by the UE, and the processor is further configured to:

transmit a control signal in a broadcast transmission to one or more UEs that includes the UE, or transmit a user plane data in a unicast transmission to the UE, wherein the UE initiates a channel occupancy.

19. A method of operation by a user equipment (UE), comprising:

receiving, from a base station using a receiving beam, control information including a transmission configuration indicator (TCI);

determining a sensing beam indicated by the TCI state included in the control information, the sensing beam to be used by the UE for communication with base station;

sensing a channel occupancy of a channel between the UE and the base station by performing a Clear Channel Assessment (CCA) using the sensing beam determined based on the TCI state, wherein the control information further includes a cell-specific signaling to configure an effective isotropic radiated power (EIRP) used for performing the CCA to sense the channel occupancy of the channel; and based on the channel occupancy, determining whether the channel is free to be utilized by the UE for communication with the base station using the sensing beam.

* * * * *